United States Patent
Bryniarski et al.

(10) Patent No.: US 6,215,559 B1
(45) Date of Patent: Apr. 10, 2001

(54) IMAGE QUEING IN PHOTOFINISHING

(75) Inventors: Gregory R. Bryniarski; Brian R. Wilson, both of Rochester; Lawrence J. Bovenzi, Webster, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/127,653

(22) Filed: Jul. 31, 1998

(51) Int. Cl.[7] .............................. G06K 15/02; H04N 1/21; H04N 1/23
(52) U.S. Cl. ........................................... 358/1.15; 358/1.16
(58) Field of Search .................................. 710/54; 399/80, 399/82; 358/1.16, 1.9, 1.15, 448, 444; 382/112

(56) References Cited

U.S. PATENT DOCUMENTS

| | | |
|---|---|---|
| 4,065,661 | 12/1977 | Jarkowsky . |
| 5,012,409 * | 4/1991 | Fletcher et al. ...................... 709/103 |
| 5,179,637 | 1/1993 | Nardozzi . |
| 5,287,194 | 2/1994 | Lobiondo . |
| 5,402,361 | 3/1995 | Peterson et al. . |
| 5,454,107 * | 9/1995 | Lehman et al. ...................... 711/153 |
| 5,535,322 | 7/1996 | Hecht . |
| 5,596,416 | 1/1997 | Barry et al. . |
| 5,612,796 | 3/1997 | DeCook et al. . |
| 5,619,624 | 4/1997 | Schoenzeit et al. . |
| 5,631,740 | 5/1997 | Webster et al. . |
| 5,649,220 | 7/1997 | Yosefi . |
| 5,664,253 * | 9/1997 | Meyers ................................. 395/603 |
| 5,745,219 | 4/1998 | DeMarti, Jr. et al. . |
| 5,995,721 * | 11/1999 | Rourke et al. ...................... 358/1.15 |

FOREIGN PATENT DOCUMENTS 0 744 651 A2    11/1996    (EP) .

* cited by examiner

*Primary Examiner*—Scott Rogers
(74) *Attorney, Agent, or Firm*—Gordon M. Stewart; David A. Novais

(57) ABSTRACT

A method of processing customer images in a photofinishing apparatus. The method includes obtaining customer image signals and associated requests for image products or services incorporating respective images. The images signals are directed into image queues having different associated formats, based on the associated product or service requested for each. The image signals are communicated from the queues to respective image renderers which render the image signals into the different formats associated with each queue. An apparatus which can execute such a method is also provided.

23 Claims, 2 Drawing Sheets

IMAGE QUEING IN PHOTOFINISHING

FIELD OF THE INVENTION

This invention relates to images, and in particular to the printing or other output of images in a photofinishing apparatus.

BACKGROUND OF THE INVENTION

In conventional photofinishing laboratories a user (sometimes referenced as a customer), delivers one or more film rolls carrying corresponding exposed films, to a processing laboratory to have them chemically developed and hardcopies of the images (such as paper prints or slides) prepared. A "photofinishing laboratory" will be understood to include a "photofinishing apparatus". The user can include an individual or a retail store. Individual films are often spliced together end to end to form a larger roll which is easily handled by automated equipment. Following chemical processing of the roll to yield permanent images from the latent images on the films, each image is scanned at high speed to obtain image characteristics, such as color and density. These characteristics are passed to an optical printer which uses the characteristic data to adjust exposure conditions (such as exposure time, color balance, and the like) of an image frame on the developed film which is optically projected onto a photosensitive paper. The exposed photosensitive paper is then chemically developed to yield the final hardcopy prints. When the customer order is completed, each film is cut into strips (for 35 mm film) or reattached to a film cassette (for Advanced Photo System films), the exposed paper (when prints are made) is cut into individual prints, and the film, completed prints and any other media (such as a disk bearing scanned images, or mounted slides) are packaged at a finishing station and the order is then complete.

In a modern photofinishing laboratory, images may optionally also be scanned to provide an image signal corresponding to each image on the film. These image signals are usually stored on a medium such as a magnetic or optical disk and provided to the customer, or made available to the customer over a network such as the Internet, and may be used then or at a later time to provide a hardcopy output. Recently it has been described that in the foregoing type of photofinishing operation, the optical printer can be replaced with a digital printer which will print the images directly from the scanned data, following enhancements or other manipulations to the scanned images.

Photofinishing laboratories using scanners and digital printers provide more versatility in correcting or enhancing (either automatically or in accordance with customer requests) customer images. Furthermore, they allow for the possibility of multiple products, and/or services, incorporating one or more images from a customer order (such products or services are sometimes referenced as "image products" and "image services"). Such image products can include, for example, prints of different sizes, T-shirts incorporating images, or cups, plates or other items carrying one or more customer images, as well as magnetic or optical discs carrying the images (in this case, in the form of image signals). Such image services can include, for example, uploading the images to a specified location through a network, such a the Internet. However, different image products or image services may require different image processing (sometimes referenced as image "rendering" in this application) of the image signals so that the processed image signals are in a format suitable for the different output devices required to provide the image product or image service (for example, different type and size of printers, or modems). For example, an ink jet printer may not produce the same colors from a given image signal as a laser printer using photosensitive paper. Consequently, different image rendering may be required for different output devices (in the foregoing example, different color correction algorithms may be applied). Any necessary rendering can be done in accordance with appropriate algorithms operating in one or more parallel programmed general purpose image processors.

However, for such digital photofinishing laboratories to produce outputs which are comparable to conventional optical prints can require resolutions of at about 2000 by 2000 pixels or more. Thus, each uncompressed consumer image can readily result in a file of about 12 or more megabytes in size. In photofinishing laboratories, images can readily be scanned from customer orders at a rate of 200 images per minute or greater. This means that the laboratory must be able to route image data rates from scanners to image renderers and to output devices, in the multiple gigabyte or higher per minute rate. Clearly, efficiency of image rendering and cost become important factors at such high data rates. When multiple general purpose image renderers are required to switch from one format of image rendering to the next, this can slow the overall process down unless.

It would be desirable then, to provide in a photofinishing apparatus and method, a means by which multiple different image formats can be rapidly and efficiently obtained, without undue cost.

SUMMARY OF THE INVENTION

The present invention then, provides in one aspect, a method of processing customer images in a photofinishing apparatus. The method includes obtaining customer image signals and associated requests for image products or services incorporating respective images. The images signals are directed into image queues having different associated formats, based on the associated product or service requested for each. The image signals are communicated from the queues to respective image renderers which render the image signals into the different formats associated with each queue. The method may additionally include forwarding the rendered images, from the renderers to respective output devices. Another aspect of the method of the invention may additionally include communicating some of the image signals from multiple queues to the same rendering device which renders the image signals from the different queues into the different formats associated with each queue. In this case, the same rendering device can receive image signals from different ones of the queues according to various methods, such as from the queues in a sequential manner (that is, one image from one queue with which it communicates, then a next image from a next queue, and so on), or from one of the queues until that queue is empty then from a next queue until that queue is empty and so on. Optionally, image signals from at least one of the queues are communicated to multiple rendering devices each of which receives image signals from only the at least one queue, and each of which renders the image signals into the format associated with the at least one queue.

A renderer can obtain images from a corresponding queue according to various routines, but preferably by "pulling" an image from the queue. That is, an image renderer may retrieve images from respective queues as the renderer becomes available to render a next image.

In the present invention, the customer image signals may be obtained from a variety of sources. For example, the images may be obtained as image signals (particularly as digital image data signals) from a magnetic or optical disk or tape, or from a remote source through a network (such as from a remote computer through the Internet). The customer image signals may also be obtained from first developing customer films carrying exposed latent images to obtain fixed optical images, then scanning the optical images to obtain corresponding customer image signals.

In another aspect, the present invention further provides a photofinishing apparatus to process customer images from multiple customers. The apparatus includes at least one real memory. By a "real memory" in the context, is referenced a physical storage device for signals (again, preferably digital data signals). Reference to multiple real memories implies multiple storage devices. The apparatus further includes a render manager which receives customer requests for products or services incorporating respective associated images (in the form of image signals). The render manager, based on the associated product or service requested for each image, directs the image signals into image queues in the memory which have different associated image formats. The apparatus also includes a plurality of image renderers communicating with respective queues, each of which can render the image signals into the format associated with the queue with which it communicates.

In an apparatus of the present invention, it is possible that a single real memory contains multiple queues. However, this can slow functioning of the system since all image data for multiple queues would have to flow into and out of one device. It is preferable that the apparatus includes multiple real memories which communicate between the render manager and respective renderers such that different memories serve as respective image queues. In one aspect of the apparatus, there is additionally included a plurality of output devices communicating with respective renderers, to provide respective requested image products or image services. Such output devices may include different printers (for example, printers which produce prints of different sizes or on different substrates such as cups, T-shirts and the like), as well as other output devices such as magnetic or optical disk or tape writers, or communication devices to transfer images over a network to remote terminals. One or more of the queues may optionally communicate with multiple rendering devices each of which renders the image signals into the format associated with the at least one queue. Optionally, each such renderer may be connected to only receive image signals from a single corresponding queue.

In an optional aspect of the apparatus, a same rendering device may receive image signals from different ones of multiple queues. This is particularly useful for the situation where one queue has a smaller number of images in a given period of time (for example, the queue is associated with an image format for an image product or image service which is infrequently ordered by customers). More than one rendering device may be connected in this manner, if desired. Such a rendered may receive images (preferably by "pulling" them) from the different queues with which it communicates, in a sequential manner or from one queue until that queue is empty before proceeding to obtain images from a next queue. In any aspect of the apparatus, renderers can be provided (or pull) images in a variety of ways. Preferably image renderers will retrieve image from respective queues as each becomes available to render a next image. The apparatus may also include various devices to provide the image signals, such as magnetic or optical disk or tape readers, or communication devices to receive images from a remote source over a network. In one aspect, the apparatus includes a developer to chemically develop customer films carrying exposed latent images to obtain fixed optical images, and a scanner to scan the optical images on customer films to obtain corresponding customer image signals.

A computer program product is also provided, for use in a photofinishing apparatus having multiple image memories and a computer with multiple processors. The computer program, when loaded into the computer, can cause the photofinishing apparatus to execute any of the methods of the present invention. In one aspect this includes: obtaining customer image signals and associated requests for image products or services incorporating respective images; directing the images signals into image queues defined by respective memories and which have different associated formats, based on the associated product or service requested for each; and communicate image signals from the queues to respective image renderers which render the image signals into the different formats associated with each queue.

The present invention provides, in a photofinishing environment, a means by which multiple different image formats can be rapidly and efficiently obtained, without undue cost.

BRIEF DESCRIPTION OF THE DRAWINGS

Embodiments of the invention will now be considered with reference to the drawings, in which.

DETAILED DESCRIPTION OF THE INVENTION

In the present application, it will be understood that a "photofinishing apparatus", "photofinishing laboratory" or similar terms, includes a wholesale or retail photofinishing environment where many images from multiple customers are processed at a cost to the customers. While many photofinishing laboratories or photofinishing apparatus will include a chemical developer in which latent images are developed, such is not essential. For example, it may be that the many images from the different customers are provided to the laboratory as digital images (for example, from digital cameras, on optical or magnetic disks, or from uploads from a remote terminal through a network such as the Internet). Furthermore, while the laboratory may include printers which write onto photosensitive medium which is then developed, this is not essential. Photographic laboratories may instead use a printer type, such as ink jet or thermal, which may write onto a suitable medium (such as a paper with a particular ink jet or thermal dye receiving coating on one side). Thus, a photofinishing laboratory, or similar terms, may or may not involve any chemistry or any photographic medium. In addition, reference to any processor or the like, includes any general purpose computer processor suitably programmed to perform the tasks required of it, or hardware equivalents or hardware and software equivalents. Reference to any memory includes solid state memory devices (such as random access memory), as well as magnetic or optical storage devices, or any other suitable data signal storage device. It will be understood that reference to any processor or memory, includes the possibility of multiple processors or memories operating in parallel or other suitable configurations.

Figure 1:
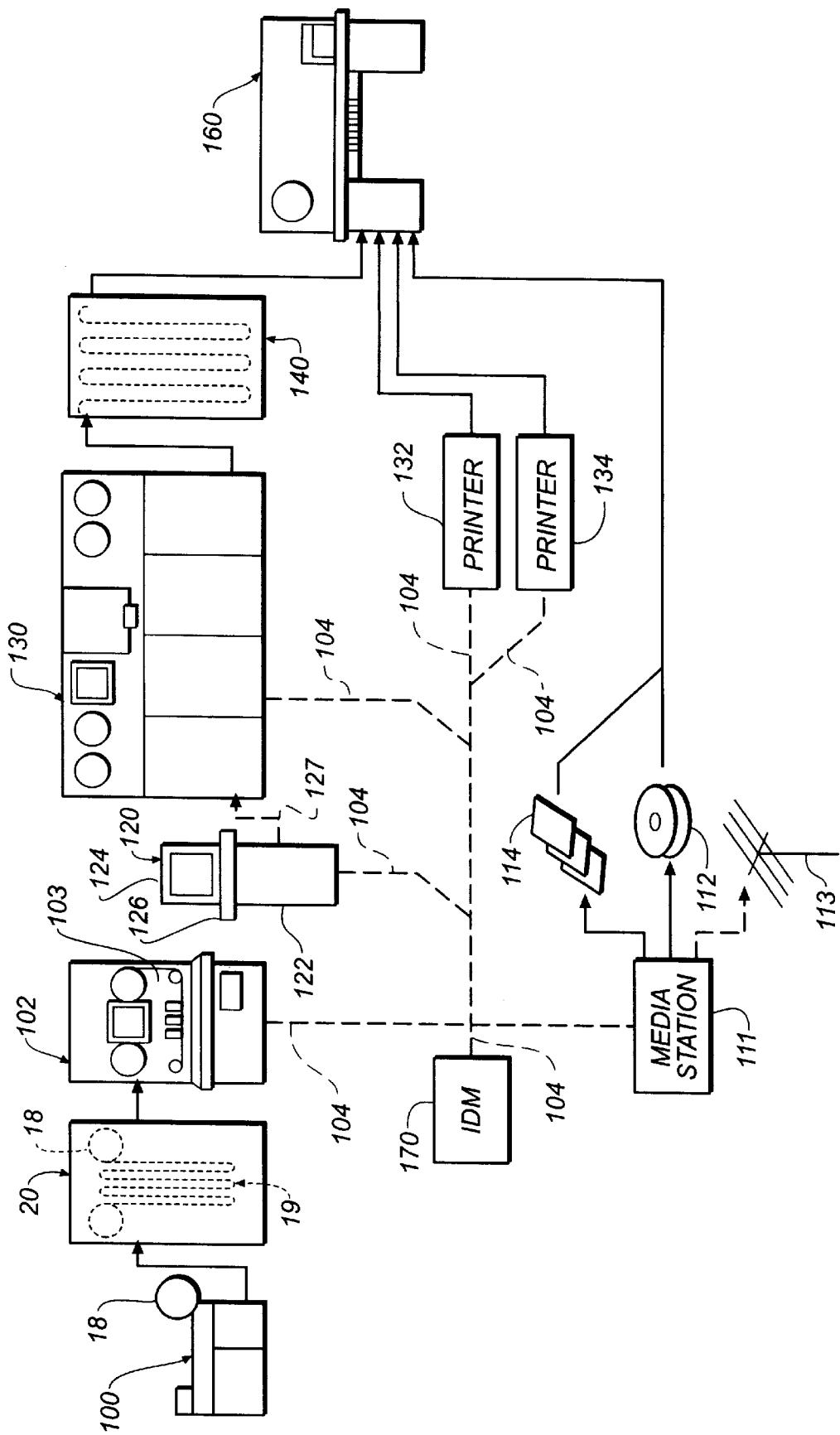
FIG. 1 is a schematic illustrating a photofinishing apparatus of the present invention.
Figure 2:
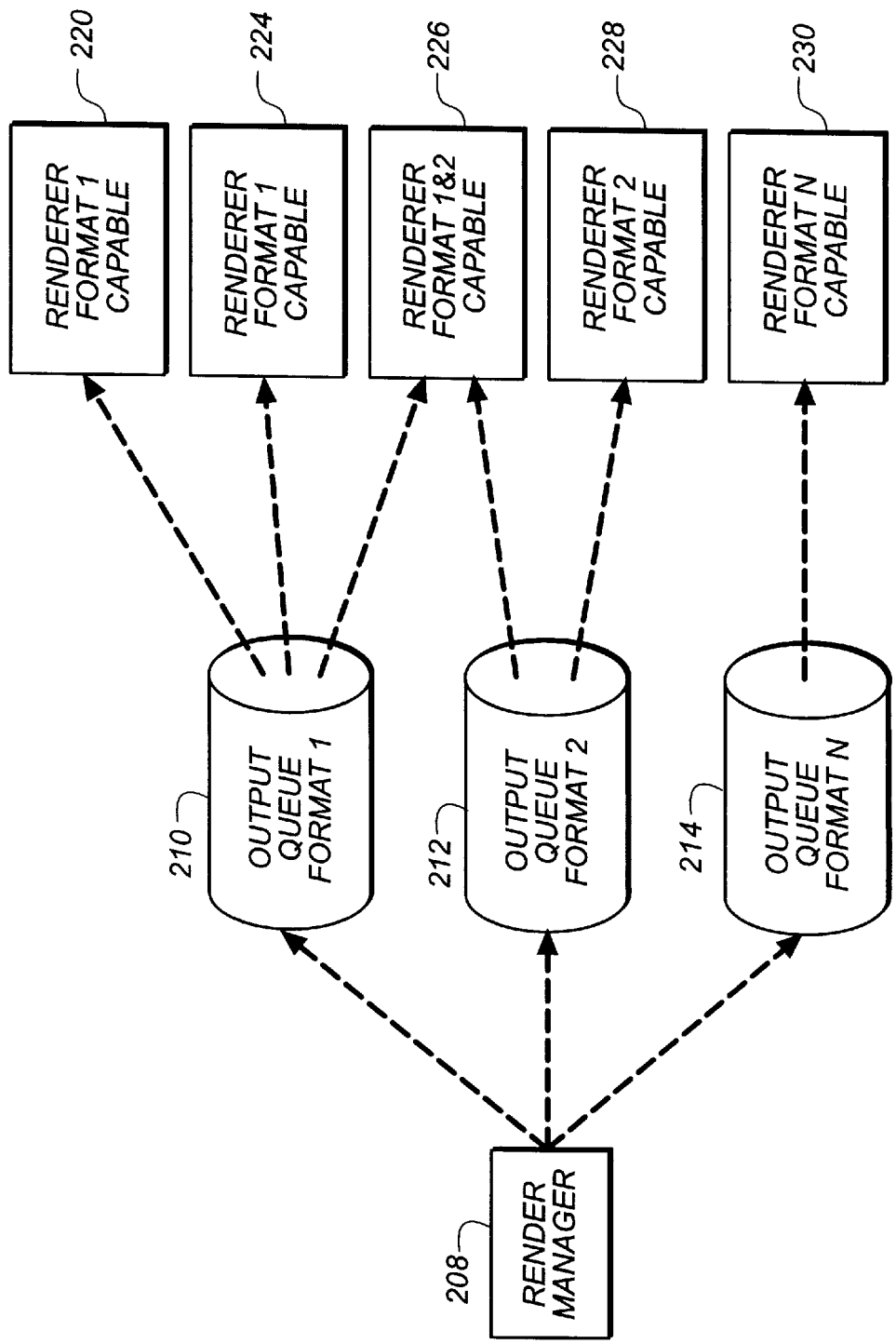
FIG. 2 illustrates some of the components of the apparatus of FIG. 1 in more detail.

Referring now to FIGS. 1 and 2, the photofinishing apparatus shown constitutes the major components of a photofinishing laboratory. The apparatus includes a splicer 100 which splices exposed light sensitive filmstrips which have been removed from their respective light tight cassettes, together into a film web 19 by attaching them end to end. Each filmstrip is normally regarded as a single customer order (although it is possible for a single customer order to include more than one filmstrip), and carries a plurality of exposed latent images. Film web 19 is placed on a reel 18. The film web 19 on reel 18 is then chemically developed through a series of steps in a chemical developer 20, in a known manner, to yield permanent visible optical images on film web 19. Each filmstrip will typically be a negative type filmstrip yielding negative type images on a transparent base after developing by chemical developer 20, although the filmstrips and developer 20 could be of a kind which produce positive transparencies (that is, slides) also in a known manner.

A developed film web 19 exiting developer 20 is then passed to a high speed scanner 102 which operates at 200 images/minute or greater. Scanner 102 includes a film gate at which each image of the film can be successively positioned to receive light from a light source, which then passes through each image and a subsequent lens system to fall upon an image sensor. The image sensor can be a line sensor or area array sensor. Appropriate electronics (including an analog to digital converter) in the scanner 102 convert the sensor signals to digital signals. The output of scanner 102 then, is a series of digital image signals corresponding to each image on the film. Scanner 102 acts as a first capture device which provides the images in the form of digital image signals. Scanner 102 should be capable of scanning images with a reasonably high resolution, such as at least 400×200 pixels over the area of images (such as at least 600×400 pixels) and preferably at least 1000×1500 pixels (and most preferably at least 2000×3000 pixels). Scanners of the foregoing type are well known in the art and need not be described further. Scanner 102 includes intermediate storage 103 for the digital images, in the form of magnetic disk drives or any other suitable read/write storage device.

Scanner 102 is also fitted with a film code reader 103, which may either be an optical or a magnetic code reader capable of reading optical or magnetic codes on a film. Such codes may, for example, be customer provided requests associated with particular specified images (such as one or more identified images or all of the images on a customer filmstrip) for specific image product or image services. For example, such codes could indicate that the customer wants a panoramic print of a specified image associated with the code, or wants a particular image product incorporating a specified image associated with a code (for example, or T-shirt or cup), or wants specified color modifications to a particular image (for example, indicating an order for a black and white print from a specified image). The codes could also indicate that the customer wants another particular type of image product (for example, a portable optical or magnetic disk) or image service (for example, an upload of a corresponding image signal to a remote location) with one or more specified images associated with the code. By "associated" in this context merely references that the image has to be identified somehow as one for which a request in a code is to be applied. Image signals are passed over communication network connection 104 from scanner 102 to an Image Data Manager ("IDM") 170. Codes read by code reader 103 may also be passed over network 104 to IDM 170.

IDM 170 is also connected through network 104 with an image preview station 120 and a number of output devices in the form of a printers 130, 132, 134. IDM 170 is further connected through network 104 to other output devices in the form of a media station 111, which provides image signal outputs on magnetic disks 114, optical disks 112, or over a communication channel 113 (which may be wire, fiber optic cable, or wireless) to the Internet. Image preview station 120 includes a processor 122 and a connected monitor 124 (sometimes referenced as a screen) and operator input device 126 in the form of a keyboard and/or mouse or other suitable operator input device. Processor 122 is optional in the sense that functions performed by it can be performed by IDM 170. Monitor 124 may, for example, be a CRT or LCD screen. Operator input device 126 also allows an operator to input codes corresponding to customer requests for particular image products or image services which may be found as printing on an envelope which carried the customer filmstrip. The request will be associated with one or more particular images by identifying those images, usually by number, on the envelope. When the operator inputs such information through input device 126 it becomes a customer code request associated with one or more particular identified images. Alternatively, a separate operator input device (not shown) may be used for such a purpose. Preview station 120 provides its output, back to IDM 170 through network 104 although it could also provide its output to printer 130 through a second network 127. Each of printers 130, 132, 134 may, for example, be a high speed color laser printer which prints digital image signals received from IDM 170 (or from preview station 120) onto a light sensitive layer of a photographic paper web. Alternatively, any or all of the printers 130, 132, 134 could be inkjet, thermal or any other suitable image printer. In the case where printer 130 writes images onto photographic paper, the exposed photographic paper from printer 130 is then developed in color paper developer 140 to yield fixed images on the paper, in a known manner. The web, following developing in developer 140 is transported to a finishing station 160 to which the scanned film web 19 on reel 18 is also sent. Similarly a web or individual printed sheets from printers 132, 134 are also transported to finishing station 160. At finishing station 160 any paper webs are cut into individual image prints, each scanned filmstrip is cut into strips (for 35 mm film) or reinserted into a cassettes (for Advanced Photo System film), and any prints from printers 130, 132, 134 are mated with the corresponding customer film and any optical or magnetic disks 112, 114 to complete the customer's order.

It will be appreciated that in the present invention, image signals may be obtained from additional or other devices which provide the images. For example, image signals might be provided to IDM 170 by being read from floppy magnetic disks 114, optical disks 112 or received from the Internet over communication channel 113. Such image signals can be handled by IDM 170 and preview station 120 in the same manner as image signals received from scanned photographic media. It will be appreciated in this case that media station 111 is a media input and output station capable of both reading and writing to disks 112, 114 and transmitting or receiving over communication channel 113.

All of the components of FIG. 1 may be individual components, as illustrated, all located at least in the same building or even the same room of a building. This will be the typical configuration of a large wholesale photofinishing laboratory. On the other hand, in situations where images are handled at a lower volumes over a given time, such as in a retail store outlet, some or all of the components of FIG. 1 may be located within a single housing occupying an area of only about 1 to 10 square meters, sometimes referred to as a "minilab" or similar terms.

Referring to FIG. 2, some of the components of IDM 170 will now be described. In particular, IDM 170 includes a processor which acts as a render manager 208. IDM 170 further includes first, second and third queue memories 210, 212, 214, respectively, which respectively act as first, second, and third image queues. IDM 170 further has five image processors which act as renderers 220, 224, 226, 228, and 230. Each of the queue memories and renderers are typically separate physical devices, with each being capable of operating independently of the others. Note that each queue memory 210, 212, 214 has at least one corresponding image renderer which receives images for rendering only from that one queue memory. The components of IDM 170 are all interconnected over the same network 104 as illustrated in FIG. 2, or alternatively another internal network can be used. Note that in FIG. 2 the connections of network 104 between each of the components of IDM 170 are illustrated as separate dashed lines for ease of understanding data flow within IDM 170. However, those dashed lines may simply represent the one network 104 cable. All of the components of IDM 170 may be housed in a single housing as represented schematically in FIG. 1, or may in whole or in part be physically separated and interconnected by the network 104 or another suitable network.

Image renderers 220, 224, 226 communicate rendered images to printer 130. This communication can also be over the same network 104, although separate physical connections could be provided from a given renderer to its corresponding printer(s). Renderers 226, 228 communicate rendered images to printer 132, while renderer 230 communicates rendered images to printer 134. Note that renderer 226 acts as a same rendering device which receives images from different queues 210, 212 and communicates such images to printers 132, 134, respectively. Renderers 220, 224, 226 then, are capable of rendering images received from queue memory 210 into a first format suitable for printer 130. Renderer 228 as well as renderer 226 are both capable of rendering images from queue memory 212 into a format suitable for printer 132, while renderer 230 is capable of rendering images from queue 214 into a format suitable for printer 134. Thus, image queue 210 communicates images to multiple renderers operating in parallel (renderers 220, 224 and in part renderer 226), while renderer 226 also communicates with multiple queue memories. Image renderers 220, 224, 228, 230 are "dedicated" in that they each receive image signals only from a single queue memory (queue memory 210 in the case of image renderers 220, 224; queue memory 212 in the case of image renderer 228; and queue memory 214 in the case of image renderer 230). However, image renderer 226 is not dedicated to one queue memory. The image formats rendered by each renderer for images received from its communicating queue memory, can be considered a format "associated" with that queue memory. For example, the image formats produced by renderers 220, 224 (and renderer 226 for image signals received from queue memory 210) for printer 130, is associated with queue memory 210. This association may be somewhat arbitrary in the sense that, when the components of FIG. 2 are all communicating over the same network 104, the initial designation of which queue memory is associated with which renderer(s) can be made by render manager 208 (such as by render manager 208 instructing a given renderer to pull image signals for rendering only from one or more of the queue memories).

Additional queue memories and renderers (not shown) may also be used, for example to render images to be output by media station 111 onto magnetic disks 114, optical disks 112, or over a communication channel 113.

In operation of the photofinishing apparatus of FIGS. 1 and 2, it will first be assumed that a film on reel 18 has already been positioned for scanning on scanner 102. Next then, film 19 is scanned on scanner 102. Optical images of a filmstrip 12 in an order (again, one filmstrip 12 typically being one order) are continuously scanned one after the other in the sequence in which they occur on the filmstrip 12, to produce corresponding digital image signals. All of the filmstrips on reel 18 are continuously scanned one after the other in the order in which they are attached together in film. The digital image signals (which may simply be referenced as "images") are sent to IDM 170 along with read film code data from film code reader 103. The film code data or input received from operator input operator input device 126 provide information on customer requested outputs for each image (for example, for a given image the customer may want a poster sized image and a T-shirt with the image). Alternatively, image signals and associated customer requests may be received from media station 111.

Render manager 208 receives the customer requests for products or services incorporating associated images, from code reader 103, operator input device 126, or from data received at media station 11, from magnetic disks 114, optical disks 112, or over communication channel 113. Render manager 208 directs each image signal into the appropriate one or more queue memories 210, 212, 214 based on the customer's product or service request associated with that image. Note that render manager 208 can direct the image signals to the appropriate queue memory in a number of ways. For example, render manager 208 can actually receive the image data itself also and, based on the associated customer requests, simply communicate the image data to the appropriate one or more queue memories 210, 212, 214. Alternatively, render manager 208 can direct the image signal to the appropriate queue by simply receiving a customer request associated with a given image along with an identification of the image with which such request is associated, and forwarding the identification of that image (including storage location on the network 104) to the appropriate one or more queue memories 210, 212, 214. Queue memories 210, 212, 214 can then issue a request over network 104 to the device where the required image data is stored, to receive the actual image data for each image identification it has received from render manager 208. The actual image data in this case can be stored at other storage devices (not shown), such as a memory within scanner 102, until requested by one or more of the image queues. Such an arrangement is disclosed in U.S. patent application entitled IMAGE MOVEMENT IN A PHOTOGRAPHIC LABORATORY filed by G. Bryniarski et al. on Jun. 29, 1998, Ser. No. 09/107,571, assigned to the same assignee as the present application. That application and all other documents cited in this application, are incorporated in this application by reference.

The configuration of having multiple renderers communicating with queue memory 210 allows for the rendering of a larger number of images per unit time (or rendering into a format requiring more computations, or both), than is possible using just one renderer communicating with a queue memory. For example, the arrangement of FIG. 2 may be used when it is known that customers will order far more image products of a type produced by printer 130 than printer 134. The use of at least one renderer (such as renderer 226) which communicates with more than one image queue, allows for more flexibility where it is expected that the ratio of different image products or services, may vary over time. Such a renderer 226 may receive image signals from multiple queue memories 210, 212 with which it communicates, based on various routines. For example, it may receive image signals sequentially from the queue memories (for example, one image from queue memory 210, then one from queue memory 212, then another from queue memory 210, and so on). Alternatively, it may receive images from one of the queue memories such as queue memory 210, until that queue memory is empty, then receive images from the next queue memory 212 until that queue memory is empty, then receive image signals from queue memory 210 again until empty, and so on. Alternatively, a time based routine may be used, or any combination of the foregoing routines used.

Preview station 120 allows an operator to preview images before printing and provide operator input on image corrections that may be required. Images shown for operator input may be limited to those which IDM 170 determines have image characteristics which make it unlikely IDM 170 would be able to simply automatically perform corrections and/or modifications based solely on its own algorithms. Such a preview station and its operation is described in copending U.S. patent application entitled PHOTOGRAPHIC PROCESSING APPARATUS AND METHOD filed by T. Murray et al. on Jan. 30, 1998, Ser. No. 09/016,238, assigned to the same assignee as the present application.

The invention has been described in detail with particular reference to certain preferred embodiments thereof, but it will be understood that variations and modifications can be effected within the spirit and scope of the invention.

What is claimed is:

1. A method of processing images in a photofinishing apparatus, comprising:
    (a) obtaining image signals and associated requests for image products or services incorporating respective images representative of the image signals;
    (b) directing the images signals into image queues having different associated formats, based on the associated image product or service requested for each of the image signals; and
    (c) communicating the image signals from the image queues to respective image renderers which render the image signals into the different formats associated with each image queue.

2. A method according to claim 1 additionally comprising forwarding the rendered images, from the renderers to a respective output device which is adapted to process the format associated with the image signal.

3. A method according to claim 1 additionally comprising communicating some of the image signals from multiple queues to the same rendering device which renders the image signals from the different queues into the different formats associated with each queue.

4. A method according to claim 1 wherein image signals from at least one of the queues are communicated to multiple rendering devices each of which receives image signals from only the at least one queue, and each of which renders the image signals into the format associated with the at least one queue.

5. A method according to claim 3 wherein the same rendering device receives image signals from different ones of the multiple queues in a sequential manner.

6. A method according to claim 3 wherein the same rendering device receives image signals from one of the queues until that queue is empty, then receives images from another of the queues.

7. A method according to claim 1 wherein the image renderers retrieve images from respective queues as each becomes available to render a next image.

8. A method of processing customer images in a photofinishing apparatus, comprising:
    (a) chemically developing customer films carrying exposed latent images to obtain fixed optical images;
    (b) scanning the optical images on the customer films to obtain corresponding customer image signals;
    (c) obtaining requests associated with the customer image signals for image products or services incorporating respective images;
    (d) directing the image signals into image queues having different associated formats, based on the associated image product or service requested for each; and
    (e) communicating image signals from the image queues to respective image rendering devices which render the image signals into the different formats associated with each image queue.

9. A method according to claim 8 additionally comprising communicating some of the image signals from multiple queues to the same rendering device which renders the image signals from the different queues into the different formats associated with each queue.

10. A method according to claim 8 wherein image signals from at least one of the queues are communicated to multiple rendering devices each of which receives image signals from only the at least one queue, and each of which renders the image signals into the format associated with the at least one queue.

11. A photofinishing apparatus to process images from multiple customers, comprising:
    (a) at least one real memory;
    (b) a render manager which receives requests for image products or services incorporating respective image signals and, based on the associated product or service requested for each image signal, directs the image signals into image queues in the memory which have different associated image formats; and
    (c) a plurality of image renderers communicating with respective image queues, each of which can render the image signals into the format associated with the image queue with which it communicates.

12. A photofinishing apparatus according to claim 11 additionally comprising one or more additional real memories, and wherein the memories communicate between the render manager and respective renderers such that different memories serve as respective image queues.

13. A photofinishing apparatus according to claim 11 additionally comprising a plurality of output devices communicating with respective renderers, to provide respective requested image products or image services.

14. A photofinishing apparatus according to claim 11 wherein at least one of the renderers additionally communicates with multiple ones of the queues and can render image signals from the multiple queues with which it communicates into the different formats associated with each queue.

15. A photofinishing apparatus according to claim 11 wherein at least one of the queues communicates image signals to multiple rendering devices, each of which renders the image signals into the format associated with the at least one queue.

16. A photofinishing apparatus according to claim 14 wherein a same rendering device receives image signals from different ones of the multiple queues in a sequential manner.

17. A photofinishing apparatus according to claim 14 wherein a same rendering device receives image signals from one of the queues until that queue is empty, then receives images from another of the queues.

18. A method according to claim 14 wherein the image renderers retrieve images from respective queues as each becomes available to render a next image.

19. A photofinishing apparatus, comprising:
(a) a developer to chemically develop films carrying exposed latent images to obtain fixed optical images;
(b) a scanner to scan the optical images on the films to obtain corresponding image signals;
(c) at least one real memory;
(d) a render manager to receive requests for image products or services incorporating respective image signals and, based on the associated product or service requested for each image, directs the image signals into image queues in the memory which have different associated image formats; and
(e) a plurality of image renderers communicating with respective queues, each of which can render the image signals into the format associated with the queue with which it communicates.

20. An apparatus according to claim 19 wherein at least one of the renderers communicates with multiple ones of the queues and can render image signals from the multiple queues with which it communicates into the different formats associated with each queue.

21. An apparatus according to claim 19 wherein at least one of the queues communicates image signals to multiple rendering, and each of which renders the image signals into the format associated with the at least one queue.

22. An apparatus according to claim 19 wherein each of the multiple rendering devices with which the at least one of the queues communicates, receives image signals from only the at least one queue.

23. A computer program product for use in a photofinishing apparatus having multiple image memories and a computer with multiple processors, comprising: a computer readable storage medium having a computer program stored thereon which when loaded into the computer causes the photofinishing apparatus to perform the steps of:
(a) obtain image signals and associated requests for image products or services incorporating respective images representative of the image signals;
(b) direct the images signals into image queues defined by respective memories and which have different associated formats, based on the associated product or service requested for each; and
(c) communicate image signals from the queues to respective image renderers which render the image signals into the different formats associated with each queue.

* * * * *